(12) United States Patent
Cline

(10) Patent No.: US 6,248,234 B1
(45) Date of Patent: *Jun. 19, 2001

(54) WATER-DISSOLVABLE BIOREMEDIATION DEVICE AND METHOD OF USE

(76) Inventor: Kenneth King Cline, 6980 Hwy. 54, Sharpsburg, GA (US) 30277-9445

( * ) Notice: Subject to any disclaimer, the term of this patent is extended or adjusted under 35 U.S.C. 154(b) by 0 days.

This patent is subject to a terminal disclaimer.

(21) Appl. No.: 09/337,295

(22) Filed: Jun. 21, 1999

Related U.S. Application Data

(63) Continuation-in-part of application No. 08/984,475, filed on Dec. 3, 1997, now Pat. No. 5,925,252.

(51) Int. Cl.$^7$ ........................................................ C02F 3/00
(52) U.S. Cl. ........................... 210/170; 210/206; 210/606; 210/611; 435/175
(58) Field of Search ........................... 210/606, 610, 210/611, 170, 206, 209; 435/174, 175

(56) References Cited

U.S. PATENT DOCUMENTS

| | | | |
|---|---|---|---|
| 4,456,544 | * 6/1984 | Lupova et al. | 435/175 |
| 4,506,015 | * 3/1985 | Ho et al. | 435/175 |
| 4,670,149 | 6/1987 | Francis . | |
| 4,810,385 | * 3/1989 | Hater et al. | 210/606 |
| 4,925,564 | 5/1990 | Francis . | |
| 5,160,525 | * 11/1992 | Stillman et al. | 210/606 |
| 5,171,687 | * 12/1992 | Moller et al. | 210/610 |
| 5,348,803 | * 9/1994 | Schlnemus et al. | 210/610 |
| 5,516,687 | * 5/1996 | Perez et al. | 210/610 |
| 5,886,950 | * 3/1999 | Dale et al. | 210/610 |

OTHER PUBLICATIONS

Compilation titled "Patents Referencing 2,987,483", by K. Cline, 9 pages.
Biographical information and exemplary claim re: Patent No. 5,397,700, 1 page.
Biographical information and exemplary claim re: Patent No. 5,554,291 from IBM patent server.
Biographical information and exemplary claim re: Patent No. 4,940,539 from IBM patent server.
Biographical information and exemplary claim re: Patent No. 5,609,753 from IBM patent server.

(List continued on next page.)

Primary Examiner—Christopher Upton
(74) Attorney, Agent, or Firm—Bernstein & Associates, PC; Jason A. Bernstein

(57) ABSTRACT

A bioremediation device including a water dissolvable material that may be held in a netting capable of suspension. The material preferably comprises surfactants that contain hydrophilic and/or hydrophobic tails that can easily form emulsions with the sewage material present by way of critical micelle formation. These surfactants preferably include but are not limited to nonionic surfactants that carry no charge. The hydrophilic portion preferably contains numerous polar ether linkages derived from polymerization of ethylene oxide and/or propylene oxide with the hydrophobe. The preferred material comprises biodegradable alkanolamine surfactants that remove grease and organic matter from waste water by biological means through the induction of bacteria and enzyme as the material dissolves in the presence of waste water. Variations in the size, shape, and amounts of bacteria in the dissolvable solid impact the nature of degradation relative to flow, waste type, and retention time to decrease the bioremediation time of the waste water.

29 Claims, 2 Drawing Sheets

OTHER PUBLICATIONS

Biographical information and exemplary claim re: Patent No. 5,522,985 from IBM patent server.

Biographical information and exemplary claim re: Patent No. 5,516,687 from IBM patent server.

Biographical information and exemplary claim re: Patent No. 5,344,557 from IBM patent server.

Biographical information and exemplary claim re: Patent No. 5,271,829 from IBM patent server.

Biographical information and exemplary claim re: Patent No. 5,171,687 from IBM patent server.

Biographical information and exemplary claim re: Patent No. 4,911,832 from IBM patent server.

Biographical information and exemplary claim re: Patent No. 4,797,208 from IBM patent server.

* cited by examiner

WATER-DISSOLVABLE BIOREMEDIATION DEVICE AND METHOD OF USE

CROSS-REFERENCE TO RELATED APPLICATION

This is a continuation-in-part application and claims the priority benefit of U.S. patent application Ser. No. 08/984,475, filed Dec. 3, 1997, now U.S. Pat. No. 5,925,252 issued Jul. 20, 1999, which is hereby incorporated by reference in its entirety.

FIELD OF THE INVENTION

This invention relates to devices for the remediation of waste water collection systems and grease traps. This invention more particularly pertains to a bioremediation device for initially reducing the grease and other organic materials in the collection system and then maintaining the remediation effects in the collection systems.

BACKGROUND OF THE INVENTION

With increasing population concentration in most suburban and urban areas it is necessary to collect the sewage from the individual residential, commercial and business sewage outflows and process it at a central location. At the central treatment plant the sewage is treated to various stages allowing the resulting product to pass back into the ecological system. If left untreated certain types of sewage outflows are too high in organic matter such as grease, such that the organic matter will clog the collection system at one or more points prior to the sewage reaching the primary sewage treatment plant and be essentially so indigestible by the bacteria present that it must be skimmed off and discarded in bulk after collection. With increases in population, present sewage treatment facilities are unable to process the increased volume of organic matter in the flow without significant capital investment in new equipment.

Along the sewage transport lines to the treatment plant pumping stations are frequently located to transport the sewage to a higher elevation. These grease traps, lift stations and wet well locations serve as a collection point for grease and other organic matter that is not decomposed within the water flow. It is a common necessity to clean out these areas at a pumping stations or other junction points in the systems where floating grease and organic matter collects, hardens and remains there until it is removed by a pump to a truck. Lines with low flow rates, bends, and changes in elevations are also prone to build up organic deposits.

Most states and municipalities have placed limitations on the quantities of oil and grease which may be introduced into the municipal sewage collection system. Most businesses and industrial companies generating grease in quantity and are required to install a grease trap on the premises to collect the grease and prevent the bulk of it from entering the collection system. The grease collects in the trap until it is removed by hand or with a pump truck.

Recently, a partial answer to the problem of frequent removal and trucking away of the grease has been provided by the use of bacterial augmentation to maximize the effectiveness of organic decomposition. A bacterial supplement of highly cultured strains of bacteria with an exceptionally high capacity for specific organic reduction are charged into the sewage system. These bacteria are designed to reduce the grease and convert it to lower molecular weight compounds which will not accumulate within the downstream sewage collection system. These bacteria operate almost exclusively in the water phase and their cultures grow in the grease and water interface, on the sides and on the bottom of the tank or trap in which they are placed.

In addition, alien bacteria which compete with the supplemental bacteria constantly enter the system with fresh sewage. As a result, the highly cultured bacteria must be added frequently, often daily. Current methods of daily treatment rely on pumping in liquid bacteria that require expensive dispensing equipment that take up needed space at the area of induction. Often these liquid systems contain less bacteria than powder forms of bacteria containing the same bacteria, because these counts are lower the reduction of grease and organic matter requires more retention time and are more sensitive to inductions of chlorine, quaternary ammonium compounds, iodine, hot water, and other disinfectant material that are used to clean and disinfect in the facilities that release the waste water and raw sewage.

The device of parent U.S. patent application Ser. No. 08/984,475, filed Dec. 3, 1997, now U.S. Pat. No. 5,925,252 issued Jul. 20, 1999, provides a bioremediation device comprising a bioactive element having at least one active ingredient present in a variable concentration, the variable concentration being greatest substantially at the outside of said element and being least within the element, so that the bioremediation effect of the element is greatest when the waste material is first exposed to the outside of the element and lessons while the element dissolves in the waste materials, whereby the outside of the bioactive element has a relatively great bioactive effect for remediating the waste material and the inside of the bioactive element has a relatively lesser bioremediating effect for maintaining the waste material in the collection system. This device may thereby initially reduce the grease and other organic materials in the collection system and then maintain the remediation effect in the collection system. The present invention, which is a continuation-in-part of the prior application, may include similar structure and compositions, with additional or substitute structure and function relating to emulsification.

SUMMARY OF THE INVENTION

The present invention alleviates or solves the above-described problems in the prior art by providing an improved bioremediation device and process. Through out the specification and claims reference is made to the term "bioremediation." This term is intended to refer to a biological process of waste degradation whereby grease and organic matter is converted to carbon dioxide and water by a biological degradation. Throughout the specification reference is made to the term "waste water." This term is intended to be broadly construed as including but not be limited to sewage, grease, and other organic materials.

The present device satisfies the need for a more effective remediation device having a variable capacity to rapidly remediate organic waste materials such as grease and accumulated surface organic matter and to also maintain the remediation process in the waste water over time. In accordance with the invention this object is accomplished by providing a remediation device of the above kind in that a bioactive element is deposited within the collection system. The bioactive element preferably has active bacterial concentration of uniform strength and concentrations distributed equally throughout the product.

The remediation device of the present invention has a bioactive dissolvable element comprising a material that dissolves easily in accordance with the flow of water across the surface of the material. The dissolvable element also acts as suspending agent for the area of waste water treatment by forming micelles with the grease in the system.

The material preferably contains a molecule that comprises a hydrophobic head and a hydrophilic tail that forms micelles with the grease in the waste water collection system. The grease is thereby trapped and suspended in the micelle pockets by emulsification so that the grease is less buoyant in the waste water system to provide additional retention time for the biological digestion process to take place. Without this emulsion formation, grease and oils would float directly above the water phase allowing less surface interfacing with the microbial remediation material.

Additionally, a synergetic effect is accomplished through the dissolvable element which includes the creation of proper retention time for the biological digestion process to take place by not dissolving too quickly under typical water flow conditions, and also to create a more soluble condition that creates more surface interfacing for microbial interaction. The bioactive dissolvable element also acts as cleaning agent for the area of treatment and becomes a food source for the bacteria as the material dissolves. The composition and size of the bioactive element is such that it dissolves slowly enough to maintain the area of treatment yet not so fast as to be washed from the system too quickly.

For installation and use of the present invention, a location is selected for installing the device that is prior to the flow of the waste water reaching the sewage treatment plant, thus allowing the treatment facility to operate at higher capacities by reducing incoming organic matter and grease. The primary locations of placement are in the drain field, in the grease trap, at the lift station, in manhole inlets, and at other points in the flow prior to the treatment facilities and having sufficient retention time to allow the bacteria to form cultures in the areas of desired treatment.

Each such location provides surface areas on which bacterial culture growth can occur, such as walls, inlet and outlet pipes, and the grease/water interface. Within sewerage pipes, the bacterial growth on the pipe itself serves as a constant source of supplemental organisms. The bacteria grow and produce bacterial colonies on the pipe which are continually scoured off by the flow of sewage. Sewers are designed to have enough slope to give a scouring velocity to prevent deposition of grit and the like. Grease traps, wet wells and other waste water containment locations do not have the scouring effects, so most of the effective surface area of growth for the replenishment of bacteria being washed out is only at the grease/water interface. In some locations, such as in a grease trap, bacteria may grow on the walls of the trap. A grease trap location is a particularly desirable location because the flow is intermittent, allowing periods of time for bacteria culture growth. The present invention further provides an inventive method in addition to the bioremediation device itself. The method of bioremediating a waste collection system with the bioremediation device as described above comprises the steps of providing a bioactive element of the type described above into the waste material, causing the device to be contacted by the waste material, dissolving the element in the waste material, reducing the waste materials in the collection system as described above, and maintaining the reduction of waste material in the collection system as described above. The method of the present invention thereby rejuvenates the waste collection system.

Accordingly, it is a principal object of the present invention is to provide a device that is able to implement higher bacterial cultures and counts into a system than a traditional liquid system.

Another object of the present invention is to allow bacterial remediation on a continuous basis.

Still another object of the present invention is to provide a structurally simple and economical device for remediating waste collection systems.

Yet another object of the present invention is to provide a bioremediation device for biological degradation of a predetermined waste material in a collection system.

Still another object of the present invention is to create a suspending agent for the area of treatment by forming micelles with the grease in the system thereby allowing the grease and organic material to become soluble through the formation of micelle pockets that suspend water insoluble in an emulsion so as to cause the grease to become less buoyant in the waste water system.

Yet another object of the present invention is to accomplish a synergetic effect including providing proper retention time for the biological digestion process to take place by not dissolving to quickly under typical water flow conditions and providing a more soluble condition that creates more surface interfacing for microbial interaction. A further object of the present invention is to provide a device for introducing high amounts of bacteria into the waste water flow without the use of costly mechanical equipment.

Still another object of the present invention is to create increased retention time of the grease in the waste water collection system with the bacteria being dispersed through this remediation mechanism by way of creating micelle formation.

The foregoing has broadly outlined some of the more pertinent objectives and features of the invention. These should be construed to be merely illustrative of some of the more prominent features and applications of the intended invention. Many other beneficial results can be obtained by applying the disclosed invention in a different manner or by modifying the disclosed embodiments. Accordingly, other objects and a more comprehensive understanding of the invention may be obtained by referring to the detailed description of the preferred embodiment taken in conjunction with the accompanying drawings, in addition to the scope of the invention defined by the claims.

DESCRIPTION OF THE DRAWINGS

The various features and advantages of the invention will be apparent from the attached drawings, in which like reference characters designate the same or similar parts throughout the figures, and in which:

FIG. 5 is a front perspective view of the present invention in a second preferred embodiment.

DESCRIPTION OF PREFERRED EMBODIMENTS

Figure 1:
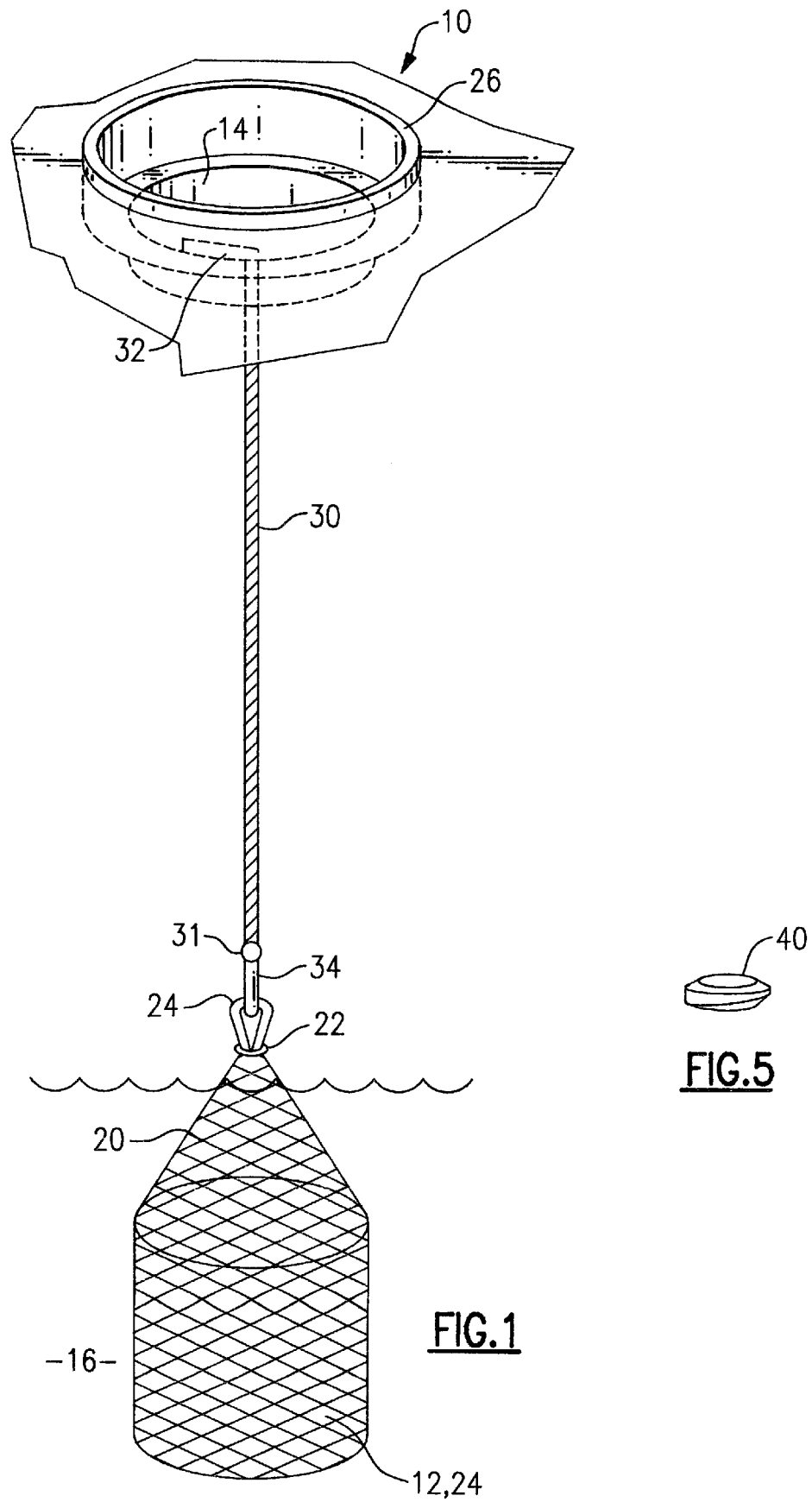
FIG. 1 is a front perspective view of a first preferred embodiment of the present invention suspended in a water collection system.
Figure 2:
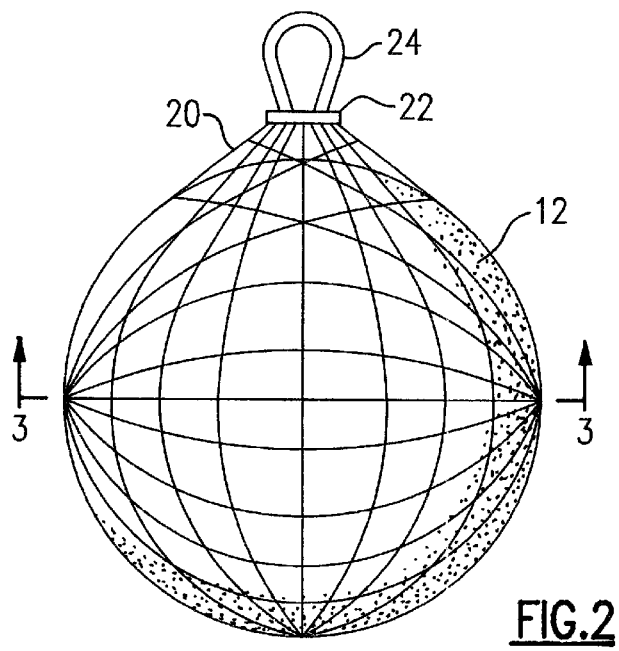
FIG. 2 is a front elevation view of the present invention in an alternative first preferred embodiment.

As shown in FIG. 1, a bioremediation device shown generally at 10 contains a dissolvable bioactive element 12 suspended from the top of a waste collection system for collecting waste material 16 such as waste water and accumulated surface scum including oil and grease. The device 10 is at least partially, and preferably completely, immersed in the waste material 16. The bioactive element 12 is enclosed within a netting 20 which allows the active ingredients 24 of the element 12 to dissolve and pass through the netting 20 and directly into the waste material. The bioactive element 12 is suspended from the collection system on a flexible line 30 having a first end 31 and a second end 32. The flexible line 30 is preferably made of a material that will retain and suspend the bioactive element 12 in the collection system until the device 10 is removed therefrom by the user (usually when the element 12 is spent).

The first end 31 of the line includes a clasp 34 or the like for detachably securing it to a loop 24 formed from the netting 20. A tie 22 gathers a portion of the netting above the bioactive element to form the loop 24. The netting 20 is preferably formed from any suitable foraminous material that permits substantially unimpeded exposure of the bioactive element 12 to the waste material 16 and waste water within the collection system. Moreover, in the preferred embodiment, the netting 20 should be able to be shaped in order to form the loop 24. The tie 22 may be of any suitably inert material such as a plastic or metal tie, ring or other closure device known to those skilled in the art which will gather a portion of the netting 20.

The second end 32 is detachably secured to a cover 26. To position the bioremediation device 10 of the present invention within the collection system, the bioactive element 12 within the netting 20 is lowered into the collection system on the flexible line 30 through an opening 14 in the top of the collection system. The cover 26 closes the existing access opening 14 to a grease trap or similar collection system.

Preferably, the initial weight of the device 10 is approximately but not limited to 10 pounds. The weight of the bioremediation device 10 should initially be sufficient to keep the bioactive element 12 submerged in the waste material as a result of having a specific gravity greater than 1. However, as the bioactive element 12 dissolves, the device 10 may eventually float to the water surface as a result of reduced weight and the natural buoyancy of the netting 20 indicating that the bioactive element 12 has almost substantially been dissolved and that the bioactive element 12 has therefore approached the end of its useful life. Thus, the present embodiment provides an easy way of determining the bioactive element 12 change-out time and to calculate the amount of product needed to treat a given collection system.

In order to remove the expended bioremediation device 10 once the bioactive element 12 has substantially dissolved, the flexible line 30 and netting 20 are pulled back through the opening 14 in the collection system. The spent device 10 may be replenished by placing a fresh device 10 through the opening 14.

The bioactive element 12 is preferably comprised of about 10% to about 50%, more preferably about 30% to about 40%, and most preferably about 33% to about 38% by weight of a blend of biodegradable surfactants. The surfactants and their concentration in the bioactive element 12 are selected to so that they are able to easily structurally degrade by the water flow across their surface and so that they create critical micelle concentrations with the grease in the waste water containment area. Furthermore, these surfactants act as both dispersing agents and create the needed retention for the biological microorganisms to properly cultivate in the waste water area. The retention time created by the micelle formation also inhibits the solid medium from breaking down or dissolving too quickly in the waste water, allowing for a relatively longer dissolution time in the waste water flow.

The surfactants generally comprise hydrophilic and/or hydrophobic portions that easily form emulsions with the sewage material and/or grease present by way of micelle formation. These surfactants preferably comprise, but are not limited to, nonionic surfactants that carry no charge. The hydrophilic portion preferably comprises at least one and preferably multiple polar ether linkages derived from polymerization of ethylene oxide and/or propylene oxide with the hydrophobe. These nonionic surfactant structures may include, but are not limited to, alkanolamides, ethoxylated alkanolamides, ethylene bisamides, mono-ethanolamides, mono-isopropanolamides, modified alkanolamides, ethoxylated alkanolamides, PEG esters, ethoxylated acids and oils, sorbitol esters, ethoxylated sorbitol esters, emulsifying waxes and esters, octyphenol aromatic ethoxylates, nonylphenol aromatic ethoxylates, dionylphenol aromatic ethoxylates, dodecylphenol aromatic ethoxylates, tristyphenol ethoxylates, isotridecyl alcohol ethoxylates, isodecyl alcohol ethoxylates, linear alcohol ethoxylates, oleyl alcohol ethoxylates, ethoxylated mercaptans, capped ethoxylates, nonylphenol ethoxylates, coconut monoethanolamines, EO/PO block copolymer nonionics, and/or mixtures thereof.

These surfactants may optionally be anionic carrying a negative charge on the hydrophilic portion, such as in the form of a carboxylate, phosphate, sulfate and/or sulfonate radical. Such anionic surfactants producing emulsifying micelle formations may comprise of but are not limited to are alkyl sulfates, ether sulfates, dodecylbenzene sulfonates, alpha olefin sulfonates, diphenyloxide disulfonate, alkyl naphthalene sulfonates, sulfosuccinate, sulfosuccinamates, naphthalene-formaldehyde condenses, sulfonesters, sulfoamides, fatty acid taurates, fatty acid isethionates, phosphate esters, ether carboxylates, and/or mixtures thereof.

The bioactive element 12 additionally comprises preferably about 1% to about 20% and more preferably about 3% to about 4% by weight of sodium thiosulfate which neutralizes the presence of chlorine ions in the waste system. The bioactive element 12 further preferably comprises about 1% to about 20% and more preferably about 1% to about 2% by weight of citric acid. Concentrations greater than 20% may be suitably employed but such concentrations are generally unnecessary to accomplish the desired results described herein and would generally add unnecessary cost to the invention 10.

The remaining portion of the bioactive element 12 is preferably comprised of sodium sulfate, sodium sulfite, sodium nitrate, sodium nitrite, and/or mixtures thereof. A cationic portion may include calcium, potassium, or magnesium. The sulfate and/or sulfite ionic portions aid in the remediation process through the sulfate reduction cycle, which reduces sulfides such as hydrogen sulfide ($H_2S$) and ferrous sulfide (FeS) which can create corrosion and odor problems in the waste system. The nitrate and/or nitrite ionic portions aid in the remediation process through the nitrification cycle.

The bioactive dissolvable element 12 further comprises microorganisms or enzymes having a capacity for organic reduction and organic maintenance. The bioactive element 12 is preferably comprised of about 10% to about 50%, more preferably about 30% to about 40%, and most preferably about 32% to about 38% by weight of a blend of microorganisms of no less than about 50 billion colony forming units per gram (CFU's). The genus of the microorganisms preferably includes but is not limited to Gram positive spore forming microorganisms, Bacillus licheniformis, Bacillus subtilis, Bacillus amyloliquiefaciens, Bacillus polymyxa, Pseudomonas aeruginosa, Pseudomononas statzeri, Pseudomonas fluoresceni, Escherichia hermanii, Bacillus cereus, Bacillus thuringiensis, and Bacillus meg'afarium, and/or mixtures thereof. Also preferably included is a source of nutrients, such as a vitamin package about 1% to about 3% by weight which may be comprised of, but is not limited to, vitamins A, B, E, K, other vitamins, and/or mixtures thereof, and/or other nutrients known to those skilled in the art which promote bacterial growth in the appropriate medium.

Preferably, the bioactive element is configured to preferably dissolved in approximately 90 days within systems having flow under 50,000 gallons per month. For systems having a flow of up to 100,000 gallons per month, the element preferably dissolves in approximately 60 days. For systems having a flow of up to 150,000 gallons per month, the element preferably dissolves in approximately 30 days. The exact number of days is not critical, but represents approximate periods depending on device 10 compositions, waste material 16 composition, temperature, flow contact made, and other factors.

The dissolvability of the element 12 may be increased or decreased by increasing or decreasing the surfactant concentration in the formulation or by varying the activities in the functional group of the surfactant. For example, a class of surfactants commonly known as alkanolamine soaps are reacted by combining an amine and a fatty acid. A preferred embodiment of the present invention utilizes biodegradable alkanolamine surfactants having differing combinations of the amine and the fatty acid in order to specify the dissolvability in accordance with the water flow. Such differing combinations include the common reaction of a coconut oil with monoethanolamine which yields a relatively softer carrier that dissolves relatively fast in lower flow situations, and an addition of steric acid with the amine functional allows the carrier to be relatively slower in dissolving properties for higher flow situations.

Figure 3:
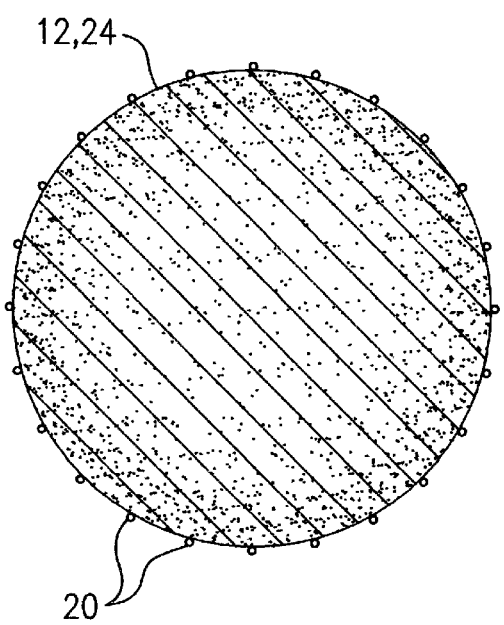
FIG. 3 is a cross section view taken along line 4—4 of FIG. 3.
Figure 4:
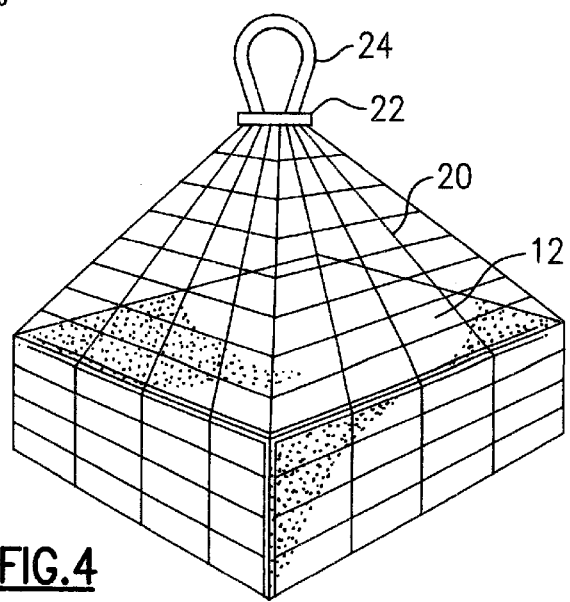
FIG. 4 is a front perspective view of the present invention in a second alternative first preferred embodiment.

It should be understood that the nature and amounts of the ingredients, as well as the physical dimensions of the bioactive element 12, are exemplary of the preferred embodiment, and are not meant to limit the practice of the present invention. The bioactive element 12 is preferably approximately 6.5 to 7.0 inches in height and has the shape of a cylinder having a thickness of approximately 6 inches. As can be seen in FIGS. 3 and 5, the present invention may alternatively be spherical or rectangular. FIG. 4 is a cross-sectional view of the spherical bioactive element shown in FIG. 3. It is to be understood, however, that the bioactive element 12 of the present invention is not limited to any particular shape.

In a second preferred embodiment as illustrated in FIG. 5, the bioactive element 40 is provided without the netting 20 of the first preferred embodiment. The bioactive element 40 is of a smaller size relative to the first embodiment, and in the shape of a puck, disk, pellet, or other regular or irregular shape. The surface texture can be solid, smooth, pitted, cellular, porous, or other form known to those skilled in the art, which can effect the component dissolution rate. A number of the elements 40 are dropped through the manhole opening 14 into the waste water for dissolving therein. The elements 40 may be provided in a mixture of varying sizes such that the smaller elements 40 dissolve faster over time and the larger elements 40 dissolve slower. The element 40 sizes may be selected depending on the proximity to the treatment plant or for an initial high bioremediation effect and also a maintained effect over time. The elements 40 may also be sized sufficiently small so that they may be dissolved in smaller containment areas such as grease traps and the like.

The use of the bioremediation device 10 as described above constitutes an inventive method of the present invention in addition to the bioremediation device 10 itself. The method of bioremediating a waste collection system with the bioremediation device 10 as described above comprises the steps of providing a bioactive element 12 of the type described above into the waste material 16, causing the device 10 to be contacted by the waste material 16, dissolving the element 10 in the waste material Reducing the waste materials in the collection system as described above, and maintaining the reduction of waste material in the collection system as described above. The method of the present invention thereby rejuvenates the waste collection system.

The examples which follows further describe, define and illustrate a number of different embodiments of this invention. Parts and percentages appearing in such examples are by weight unless otherwise stipulated. The apparatus and techniques used in the preparation of reagents and/or performance or evaluation of the invention are standard or as hereinbefore described.

EXAMPLES

Test Procedures:

The test procedures and definitions used in the experiments, the results of which are shown in the Tables, are as follows:

(a) Emulsifiability-micelle formation:

| Result | Flaking | Ingredients Bound? | Quality of Block formed |
|---|---|---|---|
| Excellent | None | All | Hard |
| Good | Some | Some | Soft |
| Fair | Lots | Some | Soft |
| Poor | n/a | None | Not formed |

Product was measured by physical appearance.

(b) Emulsion-micelle stability: stability lasted at least about sixty days.

(c) Wetting Draves: ASTM D-2281 test method was used for determination of how fast a test solution wets out.

(d) Dissolvability: When the block substantially dissolved. Product was measured by physical appearance.

Example 1

Tables 1–4 comprise test data for a preferred embodiment of the present invention. Table 1 contains test data for different surfactants at 10% of the bioactive element 12.

TABLE 1

| Raw Material Tested | TEST RESULTS | | | | |
|---|---|---|---|---|---|
| | (a) | (b) | (c) | (d) | Binding |
| Alkanolamides | | | | | |
| 1:1 diethanolamide | 1 | Passes | 15 sec. | 11 min. | Poor |
| 1:1 monoethanolamide lauric | 1 | Passes | 12 sec. | 10 min. | Poor |
| 2:1 alkanolamide coco | 1 | Passes | 13 sec. | 20 min. | Poor |
| 2:1 alkanolamide linoleic | 1 | Passes | 11 sec. | 7 min. | Poor |
| 1:1 monoethanolamide stearic | 1 | Passes | 14 sec. | 14 min. | Poor |
| 1:1 monoethanolamide lauric/myistic | 1 | Passes | 20 sec. | 10 min. | Poor |
| 1:1 monoethanolamide soya | 1 | Passes | 12 sec. | 20 min. | Poor |
| Modified 2:1 alkanolamide coco | 1 | Passes | 16 sec. | 11 min. | Poor |
| Modified 2:1 alkanolamide oleic | 1 | Passes | 14 sec. | 7 min. | Poor |
| Ethoxylated alkanolamide | 1 | Passes | 32 sec. | 14 min. | Poor |
| Alcohol glycerol/glycol esters | 3 | Failed | 10 sec. | 46 min. | Poor |
| Diethylene glycol monostearate | 1 | Passes | 12 sec. | 20 min. | Poor |
| Ethylene glycol monostearate | 3 | Failed | 17 sec. | 7 min. | Poor |
| Glycol mono and dioleate | 1 | Passes | 19 sec. | 14 min. | Poor |
| Glycerol monostearate | 1 | Passes | 22 sec. | 11 min. | Poor |
| Stearyl stearate | 3 | Failed | 42 sec. | 14 min. | Poor |
| Myristyl myristate | 1 | Passes | 24 sec. | 14 min. | Poor |
| PEG 400 Dioleate | 1 | Passes | 32 sec. | 20 min. | Poor |
| PEG 8 Oleate | 1 | Passes | 19 sec. | 14 min. | Poor |
| PEG 600 Dioleate | 1 | Passes | 16 sec. | 14 min. | Poor |
| PEG 14 Oleate | 1 | Passes | 22 sec. | 7 min. | Poor |
| Castor oil + 200 EO/50% | 1 | Passes | 52 sec. | 14 min. | Poor |
| Sorbitan Monolaurate + 20 EO | 3 | Failed | 61 sec. | 20 min. | Poor |
| Sorbitan Trioleate + 20 EO | 3 | Failed | 12 sec. | 10 min. | Poor |
| Sorbitan Monolaurate | 3 | Failed | 15 sec. | 14 min. | Poor |
| Sorbitan Trioleate | 3 | Failed | 11 sec. | 46 min. | Poor |
| Glycerol stearate emulsifying wax | 3 | Failed | 33 sec. | 11 min. | Poor |
| Cetearyl alcohol emulsifying wax | 3 | Failed | 12 sec. | 20 min. | Poor |
| Octylphenol aromatic ethoxlyate | 2 | Passes | 20 sec. | 14 min. | Poor |
| Nonylphenol aromatic ethoxlyate 1.5 M | 1 | Passes | 12 sec. | 14 min. | Poor |
| Nonylphenol aromatic ethoxlyate 4 M | 2 | Passes | 11 sec. | 7 min. | Poor |
| Nonylphenol aromatic ethoxlyate 5 M | 1 | Passes | 22 sec. | 10 min. | Poor |
| Nonylphenol aromatic ethoxlyate 6 M | 1 | Passes | 12 sec. | 14 min. | Poor |
| Nonylphenol aromatic ethoxlyate 7–8 M | 1 | Passes | 18 sec. | 20 min. | Poor |
| Nonylphenol aromatic ethoxlyate 9 M | 1 | Passes | 12 sec. | 14 min. | Poor |
| Nonylphenol aromatic ethoxlyate 10 M | 1 | Passes | 20 sec. | 10 min. | Poor |
| Nonylphenol aromatic ethoxlyate 11 M | 1 | Passes | 11 sec. | 7 min. | Poor |
| Nonylphenol aromatic ethoxlyate 12 M | 1 | Passes | 12 sec. | 14 min. | Poor |
| Nonylphenol aromatic ethoxlyate 63 M | 1 | Passes | 15 sec. | 20 min. | Poor |
| Nonylphenol aromatic ethoxlyate 72 M | 1 | Passes | 22 sec. | 11 min. | Poor |
| Nonylphenol aromatic ethoxlyate 78 M | 1 | Passes | 12 sec. | 14 min. | Poor |
| Nonylphenol aromatic ethoxlyate 100 M | 1 | Passes | 12 sec. | 14 min. | Poor |
| Dinoylphenol aromatic ethoxlyate 7–10 | 1 | Passes | 18 sec. | 20 min. | Poor |
| Dodecylphenol aromatic ethoxylate | 2 | Passes | 11 sec. | 10 min. | Poor |
| Diamylphenol | 2 | Passes | 12 sec. | 10 min. | Poor |
| Tristylphenol ethoxylate | 1 | Passes | 15 sec. | 14 min. | Poor |
| Isotridecyl alcohol ethoxylate | 2 | Passes | 12 sec. | 20 min. | Poor |
| Linear alcohol ethoxylate (6–12 M) | 1 | Passes | 20 sec. | 14 min. | Poor |
| Octylphenol ethoxylate | 1 | Passes | 15 sec. | 14 min. | Poor |
| Ethoxylated mercaptan | 1 | Passes | 12 sec. | 7 min. | Poor |
| Dodecyl mercaptan (6–10 M) | 2 | Passes | 22 sec. | 11 min. | Poor |
| Linear alcohol EO/PO block ethoxylate | 1 | Passes | 12 sec. | 14 min. | Poor |
| Linear alcohol EO/chlorine | 1 | Passes | 12 sec. | 10 min. | Poor |
| P-phenyl phenal PO/EO | 1 | Passes | 18 sec. | 14 min. | Poor |
| Tristylphenol EO/PO | 1 | Passes | 15 sec. | 20 min. | Poor |
| Block copolymer | 4 | Failed | 12 sec. | 46 min. | Poor |
| Reverse copolymer | 4 | Failed | 11 sec. | 20 min. | Poor |
| Nonionic guar gum | 4 | Failed | None | 10 min. | Poor |
| Cationic guar gum | 4 | Failed | None | 11 min. | Poor |
| Rice Starch | 4 | Failed | None | 20 min. | Poor |
| Starch | 4 | Failed | None | 7 min. | Poor |
| Xanthan gum | 4 | Failed | 12 sec. | 14 min. | Poor |
| Sodium lauryl sulfate | 1 | Passes | 20 sec. | 20 min. | Poor |
| Sodium tridecyl sulfate | 1 | Passes | 18 sec. | 14 min. | Poor |
| Ammonium tristyrylphenol | 1 | Passes | 12 sec. | 46 min. | Poor |
| Dodecylbenzene sulfonate | 2 | Passes | 22 sec. | 10 min. | Poor |
| Alkyl sulfate | 2 | Passes | 12 sec. | 14 min. | Poor |
| Ether sulfate | 2 | Passes | 15 sec. | 20 min. | Poor |
| Sodium Octyl sulfate | 2 | Passes | 12 sec. | 14 min. | Poor |
| Sulfosuccinate | 2 | Passes | 20 sec. | 46 min. | Poor |
| Alpha olefin sulfonate | 2 | Passes | 11 sec. | 20 min. | Poor |
| Diphenyloxide disulfonate | 2 | Passes | 12 sec. | 7 min. | Poor |
| Sulfonamide | 1 | Passes | 18 sec. | 14 min. | Poor |

TABLE 1-continued

| Raw Material Tested | (a) | (b) | (c) | (d) | Binding |
|---|---|---|---|---|---|
| Alkyl naphthalene sulfonate | 1 | Passes | 12 sec. | 10 min. | Poor |
| Naphthalene sulfonates | 3 | Failed | 20 sec. | 11 min. | Poor |
| Phosphate ester linear alcohol | 2 | Passes | 11 sec. | 46 min. | Poor |
| Phosphate ester | 3 | Failed | 22 sec. | 20 min. | Poor |

Table 2 contains test data for different surfactants at 30% of the bioactive element 12.

TABLE 2

| Raw Material Tested | (a) | (b) | (c) | (d) | Binding |
|---|---|---|---|---|---|
| Alkanolamides | | | | | |
| 1:1 diethanolamide | 1 | Passes | 15 sec. | 25 min. | Good |
| 1:1 monoethanolamide lauric | 1 | Passes | 12 sec. | 25 min. | Good |
| 2:1 alkanolamide coco | 1 | Passes | 13 sec. | 25 min. | Good |
| 2:1 alkanolamide linoleic | 1 | Passes | 11 sec. | 25 min. | Good |
| 1:1 monoethanolamide stearic | 1 | Passes | 14 sec. | 25 min. | Good |
| 1:1 monoethanolamide lauric/myistic | 1 | Passes | 20 sec. | 25 min. | Good |
| 1:1 monoethanolamide soya | 1 | Passes | 12 sec. | 25 min. | Good |
| Modified 2:1 alkanolamide coco | 1 | Passes | 16 sec. | 25 min. | Good |
| Modified 2:1 alkanolamide oleic | 1 | Passes | 14 sec. | 25 min. | Good |
| Ethoxylated alkanolamide | 1 | Passes | 32 sec. | 16 min. | Good |
| Alcohol glycerol/glycol esters | 3 | Failed | 10 sec. | 46 min. | Poor |
| Diethylene glycol monostearate | 1 | Passes | 12 sec. | 22 min. | Poor |
| Ethylene glycol monostearate | 3 | Failed | 17 sec. | 11 min. | Good |
| Glycol mono and dioleate | 1 | Passes | 19 sec. | 18 min. | Poor |
| Glycerol monostearate | 1 | Passes | 22 sec | 11 min | Poor |
| Stearyl stearate | 3 | Failed | 42 sec. | 18 min. | Poor |
| Myristyl myristate | 1 | Passes | 24 sec. | 14 min. | Poor |
| PEG 400 Dioleate | 1 | Passes | 32 sec. | 28 min. | Poor |
| PEG 8 Oleate | 1 | Passes | 19 sec. | 18 min. | Poor |
| PEG 600 Dioleate | 1 | Passes | 16 sec. | 18 min. | Poor |
| PEG 14 Oleate | 1 | Passes | 22 sec. | 7 min. | Poor |
| Castor oil + 200 EO/50% | 1 | Passes | 52 sec. | 18 min. | Poor |
| Sorbitan Monolaurate + 20 EO | 3 | Failed | 61 sec. | 27 min. | Poor |
| Sorbitan Trioleate + 20 EO | 3 | Failed | 12 sec. | 10 min. | Poor |
| Sorbitan Monolaurate | 3 | Failed | 15 sec. | 18 min. | Poor |
| Sorbitan Trioleate | 3 | Failed | 11 sec. | 51 min. | Poor |
| Glycerol stearate emulsifying wax | 3 | Failed | 33 sec. | 11 min. | Poor |
| Cetearyl alcohol emulsifying wax | 3 | Failed | 12 sec. | 24 min. | Poor |
| Octylphenol aromatic ethoxlyate | 2 | Passes | 20 sec. | 14 min. | Good |
| Nonylphenol aromatic ethoxlyate 1.5 M | 1 | Passes | 12 sec. | 18 min. | Good |
| Nonylphenol aromatic ethoxlyate 4 M | 2 | Passes | 11 sec. | 7 min. | Good |
| Nonylphenol aromatic ethoxlyate 5 M | 1 | Passes | 22 sec. | 10 min. | Good |
| Nonylphenol aromatic ethoxlyate 6 M | 1 | Passes | 12 sec. | 14 min. | Good |
| Nonylphenol aromatic ethoxlyate 7–8 M | 1 | Passes | 18 sec. | 22 min. | Good |
| Nonylphenol aromatic ethoxlyate 9 M | 1 | Passes | 12 sec. | 18 min. | Good |
| Nonylphenol aromatic ethoxlyate 10 M | 1 | Passes | 20 sec. | 10 min. | Good |
| Nonylphenol aromatic ethoxlyate 11 M | 1 | Passes | 11 sec. | 12 min. | Good |
| Nonylphenol aromatic ethoxlyate 12 M | 1 | Passes | 12 sec. | 18 min. | Good |
| Nonylphenol aromatic ethoxlyate 63 M | 1 | Passes | 15 sec. | 27 min. | Good |
| Nonylphenol aromatic ethoxlyate 72 M | 1 | Passes | 22 sec. | 11 min. | Good |
| Nonylphenol aromatic ethoxlyate 78 M | 1 | Passes | 12 sec. | 18 min. | Good |
| Nonylphenol aromatic ethoxlyate 100 M | 1 | Passes | 12 sec. | 14 min. | Good |
| Dinoylphenol aromatic ethoxlyate 7–10 | 1 | Passes | 18 sec. | 20 min. | Poor |
| Dodecylphenol aromatic ethoxylate | 2 | Passes | 11 sec. | 10 min. | Poor |
| Diamylphenol | 2 | Passes | 12 sec. | 10 min. | Poor |
| Tristylphenol ethoxylate | 1 | Passes | 15 sec. | 18 min. | Poor |
| Isotridecyl alcohol ethoxylate | 2 | Passes | 12 sec. | 27 min. | Poor |
| Linear alcohol ethoxylate (6–12 M) | 1 | Passes | 20 sec. | 14 min. | Poor |
| Octylphenol ethoxylate | 1 | Passes | 15 sec. | 18 min. | Poor |
| Ethoxylated mercaptan | 1 | Passes | 12 sec. | 7 min. | Poor |
| Dodecyl mercaptan (6–10 M) | 2 | Passes | 22 sec. | 11 min. | Poor |
| Linear alcohol EO/PO block ethoxylate | 1 | Passes | 12 sec. | 18 min. | Poor |
| Linear alcohol EO/chlorine | 1 | Passes | 12 sec. | 10 min. | Poor |
| P-phenyl phenal PO/EO | 1 | Passes | 18 sec. | 27 min. | Poor |
| Tristylphenol EO/PO | 1 | Passes | 15 sec. | 20 min, | Poor |

TABLE 2-continued

| Raw Material Tested | (a) | (b) | (c) | (d) | Binding |
|---|---|---|---|---|---|
| Block copolymer | 4 | Failed | 12 sec. | 46 min. | Poor |
| Reverse copolymer | 4 | Failed | 11 sec. | 27 min. | Poor |
| Nonionic guar gum | 4 | Failed | None | 10 min. | Good |
| Cationic guar gum | 4 | Failed | None | 11 min. | Good |
| Rice Starch | 4 | Failed | None | 27 min. | Good |
| Starch | 4 | Failed | None | 7 min. | Good |
| Xanthan gum | 4 | Failed | 12 sec. | 14 min. | Good |
| Sodium lauryl sulfate | 1 | Passes | 20 sec. | 27 min. | Poor |
| Sodium tridecyl sulfate | 1 | Passes | 18 sec. | 18 min. | Poor |
| Ammonium tristyrylphenol | 1 | Passes | 12 sec. | 46 min. | Poor |
| Dodecylbenzene sulfonate | 2 | Passes | 22 sec. | 10 min. | Good |
| Alkyl sulfate | 2 | Passes | 12 sec. | 14 min. | Poor |
| Ether sulfate | 2 | Passes | 15 sec. | 27 min. | Poor |
| Sodium Octyl sulfate | 2 | Passes | 12 sec. | 14 min. | Poor |
| Sulfosuccinate | 2 | Passes | 20 sec. | 46 min. | Poor |
| Alpha olefin sulfonate | 2 | Passes | 11 sec. | 27 min. | Poor |
| Diphenyloxide disulfonate | 2 | Passes | 12 sec. | 7 min. | Poor |
| Sulfonamide | 1 | Passes | 18 sec. | 18 min. | Good |
| Alkyl naphthalene sulfonate | 1 | Passes | 12 sec. | 10 min. | Poor |
| Naphthalene sulfonates | 3 | Failed | 20 sec. | 11 min. | Poor |
| Phosphate ester linear alcohol | 2 | Passes | 11 sec. | 46 min. | Poor |
| Phosphate ester | 3 | Failed | 22 sec. | 27 min. | Poor |

Table 3 contains test data for different surfactants at 40% of the bioactive element 12.

TABLE 3

| Raw Material Tested | (a) | (b) | (c) | (d) | Binding |
|---|---|---|---|---|---|
| Alkanolamides | | | | | |
| 1:1 diethanolamide | 1 | Passes | 15 sec. | 87 min. | Excellent |
| 1:1 monoethanolamide lauric | 1 | Passes | 12 sec. | 75 min. | Excellent |
| 2:1 alkanolamide coco | 1 | Passes | 11 sec. | 72 min. | Excellent |
| 2:1 alkanolamide linoleic | 1 | Passes | 11 sec. | 64 min. | Excellent |
| 1:1 monoethanolamide stearic | 1 | Passes | 14 sec. | 122 min. | Excellent |
| 1:1 monoethanolamide lauric/myistic | 1 | Passes | 20 sec. | 95 min. | Excellent |
| 1:1 monoethanolamide soya | 1 | Passes | 12 sec. | 54 min. | Excellent |
| Modified 2:1 alkanolamide coco | 1 | Passes | 16 sec. | 87 min. | Excellent |
| Modified 2:1 alkanolamide oleic | 1 | Passes | 14 sec. | 75 min. | Excellent |
| Ethoxylated alkanolamide | 1 | Passes | 32 sec. | 56 min. | Excellent |
| Alcohol glycerol/glycol esters | 3 | Failed | 10 sec. | | Poor |
| Diethylene glycol monostearate | 1 | Passes | 12 sec. | | Poor |
| Ethylene glycol monostearate | 3 | Failed | 17 sec. | | Good |
| Glycol mono and dioleate | 1 | Passes | 19 sec. | | Poor |
| Glycerol monostearate | 1 | Passes | 22 sec. | | Poor |
| Stearyl stearate | 3 | Failed | 42 sec. | | Poor |
| Myristyl myristate | 1 | Passes | 24 sec. | | Poor |
| PEG 400 Dioleate | 1 | Passes | 32 sec. | | Poor |
| PEG 8 Oleate | 1 | Passes | 19 sec. | | Poor |
| PEG 600 Dioleate | 1 | Passes | 16 sec. | | Poor |
| PEG 14 Oleate | 1 | Passes | 22 sec. | | Poor |
| Castor oil + 200 EO/50% | 1 | Passes | 52 sec. | | Poor |
| Sorbitan Monolaurate + 20 EO | 1 | Failed | 61 sec. | | Poor |
| Sorbitan Trioleate + 20 EO | 3 | Failed | 12 sec. | | Poor |
| Sorbitan Monolaurate | 3 | Failed | 15 sec. | | Poor |
| Sorbitan Trioleate | 3 | Failed | 11 sec. | | Poor |
| Glycerol stearate emulsifying wax | 3 | Failed | 33 sec. | | Poor |
| Cetearyl alcohol emulsifying wax | 3 | Failed | 12 sec. | | Poor |
| Octylphenol aromatic ethoxlyate | 2 | Passes | 20 sec. | 34 min. | Good |
| Nonylphenol aromatic ethoxlyate 1.5 M | 1 | Passes | 12 sec. | 32 min. | Good |
| Nonylphenol aromatic ethoxlyate 4 M | 2 | Passes | 11 sec. | 18 min. | Good |
| Nonylphenol aromatic ethoxlyate 5 M | 1 | Passes | 22 sec. | 29 min. | Good |
| Nonylphenol aromatic ethoxlyate 6 M | 1 | Passes | 12 sec. | 34 min. | Good |
| Nonylphenol aromatic ethoxlyate 7–8 M | 1 | Passes | 18 sec. | 25 min. | Good |
| Nonylphenol aromatic ethoxlyate 9 M | 1 | Passes | 12 sec. | 25 min. | Good |
| Nonylphenol aromatic ethoxlyate 10 M | 1 | Passes | 20 sec. | 29 min. | Good |
| Nonylphenol aromatic ethoxlyate 11 M | 1 | Passes | 11 sec. | 52 min. | Good |

TABLE 3-continued

| | TEST RESULTS | | | | |
|---|---|---|---|---|---|
| Raw Material Tested | (a) | (b) | (c) | (d) | Binding |
| Nonylphenol aromatic ethoxlyate 12 M | 1 | Passes | 12 sec. | 56 min. | Good |
| Nonylphenol aromatic ethoxlyate 63 M | 1 | Passes | 15 sec. | 66 min. | Excellent |
| Nonylphenol aromatic ethoxlyate 72 M | 1 | Passes | 22 sec. | 68 min. | Excellent |
| Nonylphenol aromatic ethoxlyate 78 M | 1 | Passes | 12 sec. | 73 min. | Excellent |
| Nonylphenol aromatic ethoxlyate 100 M | 1 | Passes | 12 sec. | 81 min. | Excellent |
| Dinoylphenol aromatic ethoxlyate 7–10 | 1 | Passes | 18 sec. | | Poor |
| Dodecylphenol aromatic ethoxylate | 2 | Passes | 11 sec. | | Poor |
| Diamylphenol | 2 | Passes | 12 sec. | | Poor |
| Tristylphenol ethoxylate | 1 | Passes | 15 sec. | | Poor |
| Isotridecyl alcohol ethoxylate | 2 | Passes | 12 sec. | | Poor |
| Linear alcohol ethoxylate (6–12 M) | 1 | Passes | 20 sec. | | Poor |
| Octylphenol ethoxylate | 1 | Passes | 15 sec. | | Poor |
| Ethoxylated mercaptan | 1 | Passes | 12 sec. | | Poor |
| Dodecyl mercaptan (6–10 M) | 2 | Passes | 22 sec. | | Poor |
| Linear alcohol EO/PO block ethoxylate | 1 | Passes | 12 sec. | | Poor |
| Linear alcohol EO/chlorine | 1 | Passes | 12 sec. | | Poor |
| P-phenyl phenal PO/EO | 1 | Passes | 18 sec. | | Poor |
| Tristylphenol EO/PO | 1 | Passes | 15 sec. | | Poor |
| Block copolymer | 4 | Failed | 12 sec. | | Poor |
| Reverse copolymer | 4 | Failed | 11 sec. | | Poor |
| Nonionic guar gum | 4 | Failed | None | NA | Excellent |
| Cationic guar gum | 4 | Failed | None | NA | Excellent |
| Rice Starch | 4 | Failed | None | NA | Excellent |
| Starch | 4 | Failed | None | NA | Excellent |
| Xanthan gum | 4 | Failed | 12 sec. | NA | Excellent |
| Sodium lauryl sulfate | 1 | Passes | 20 sec. | 36 min. | Good |
| Sodium tridecyl sulfate | 1 | Passes | 18 sec. | 25 min. | Good |
| Ammonium tristyrylphenol | 1 | Passes | 12 sec. | 51 min. | Good |
| Dodecylbenzene sulfonate | 2 | Passes | 22 sec. | 50 min. | Good |
| Alkyl sulfate | 2 | Passes | 12 sec. | 34 min. | Good |
| Ether sulfate | 2 | Passes | 15 sec. | 38 min. | Good |
| Sodium Octyl sulfate | 2 | Passes | 12 sec. | 41 min. | Good |
| Sulfosuccinate | 2 | Passes | 20 sec. | 55 min. | Good |
| Alpha olefin sulfonate | 2 | Passes | 11 sec. | 37 min. | Good |
| Diphenyloxide disulfonate | 2 | Passes | 12 sec. | 12 min. | Good |
| Sulfonamide | 1 | Passes | 18 sec. | 21 min. | Good |
| Alkyl naphthalene sulfonate | 1 | Passes | 12 sec. | 17 min. | Good |
| Naphthalene sulfonates | 3 | Failed | 20 sec. | 19 min. | Good |
| Phosphate ester linear alcohol | 2 | Passes | 11 sec. | | Poor |
| Phosphate ester | 3 | Failed | 22 sec. | | Poor |

Table 4 contains test data for BOD/COD testing of the device 10. Initial BOD was 1560 mg/l; initial COD was 3588 mg/l, the final result run was at 72 hours; with 40% surfactant binding.

TABLE 4

| | TEST RESULTS | |
|---|---|---|
| Raw Material Tested | Final BOD | Final COD |
| Alkanolamides | | |
| 1:1 diethanolamide | 562 mg/l | 988 mg/l |
| 1:1 monoethanolamide lauric | 633 mg/l | 1231 mg/l |
| 2:1 alkanolamide coco | 420 mg/l | 921 mg/l |
| 2:1 alkanolamide linoleic | 422 mg/l | 902 mg/l |
| 1:1 monoethanolamide stearic | 332 mg/l | 744 mg/l |
| 1:1 monoethanolamide lauric/myistic | 332 mg/l | 744 mg/l |
| 1:1 monoethanolamide soya | 332 mg/l | 744 mg/l |
| Modified 2:1 alkanolamide coco | 525 mg/l | 1002 mg/l |
| Modified 2:1 alkanolamide oleic | 487 mg/l | 908 mg/l |
| Ethoxylated alkanolamide | 675 mg/l | 1280 mg/l |
| Coconut alkanolamide | 472 mg/l | 854 mg/l |
| Octylphenol aromatic ethoxlyate | 720 mg/l | 1440 mg/l |
| Nonylphenol aromatic ethoxlyate 1.5 M | 720 mg/l | 1440 mg/l |
| Nonylphenol aromatic ethoxlyate 4 M | 720 mg/l | 1440 mg/l |
| Nonylphenol aromatic ethoxlyate 5 M | 720 mg/l | 1440 mg/l |
| Nonylphenol aromatic ethoxlyate 6 M | 720 mg/l | 1440 mg/l |
| Nonylphenol aromatic ethoxlyate 7–8 M | 720 mg/l | 1440 mg/l |
| Nonylphenol aromatic ethoxlyate 9 M | 720 mg/l | 1440 mg/l |
| Nonylphenol aromatic ethoxlyate 10 M | 720 mg/l | 1440 mg/l |
| Nonylphenol aromatic ethoxlyate 11 M | 720 mg/l | 1440 mg/l |
| Nonylphenol aromatic ethoxlyate 12 M | 720 mg/l | 1440 mg/l |
| Nonylphenol aromatic ethoxlyate 63 M | 720 mg/l | 1440 mg/l |
| Nonylphenol aromatic ethoxlyate 72 M | 720 mg/l | 1440 mg/l |
| Nonylphenol aromatic ethoxlyate 78 M | 720 mg/l | 1440 mg/l |
| Nonylphenol aromatic ethoxlyate 100 M | 720 mg/l | 1440 mg/l |
| Dinoylphenol aromatic ethoxlyate 7–10 | 720 mg/l | 1440 mg/l |
| Dodecylphenol aromatic ethoxylate | 720 mg/l | 1440 mg/l |
| Nonionic guar gum | 1560 mg/l | 3588 mg/l |
| Cationic guar gum | 1560 mg/l | 3588 mg/l |
| Rice Starch | 1560 mg/l | 3588 mg/l |
| Starch | 1560 mg/l | 3588 mg/l |
| Xanthan gum | 1560 mg/l | 3588 mg/l |
| Sodium lauryl sulfate | 1560 mg/l | 3588 mg/l |
| Dodecylbenzene sulfonate | 520 mg/l | 1038 mg/l |
| Alpha olefin sulfonate | 989 mg/l | 1765 mg/l |

The micelle concentration was measured by emulsifiability and emulsion stability, the formation of the micelle being critical as to the pulling of the oil and grease into the water phase where the bacteria is then able to degrade and digest the organic material present. The emulsion stability was based on cloud point comparisons. If the material being used as the binder did not form a stable emulsion at a cloud point above about 120° F., then the surfactant did not pass the micelle formation testing. This does not mean that this material could not be used in the formulation of the device 10, but it is not the optimal choice for performance in the product.

The wetting was tested in order to determine the ability of the surfactant to both clean by way of pulling organic material into the solution and by creating the quickness of micelle formation. The dissolvability was tested by placing a 25 gram sample of the surfactant in combination with the other ingredients in a water system with 5 psi of water pressure run across the surface. This test provides an idea of which surfactant will last the longest in the field as water is passed across the surface. Once the surfactants were narrowed down and the appropriate percentages of the surfactant needed to create proper binding, the formula was field tested to provide more exact numbers in how quickly the solid materials would last under the specific water flow. The binding was also a physical observation on how well all ingredients were held in suspension. Still another observation would be mixing and temperature (should a material need to be melted). These materials were also considered as to the ability of the microorganism to survive under the stress of production.

Thus, in selecting the surfactants and their relative concentrations in the bioactive element 10, dissolvability is a primary consideration. The test results indicate that the desired dissolvability may be obtained with surfactant concentrations of preferably about 10% to about 50%, more preferably about 30% to about 40%, and most preferably about 33% to about 38%, as described hereinbefore.

Finally, the surfactants were tested in various concentrations to determine the percentages that would give optimal performance. Once this was determined, a predetermined BOD (Biological Oxygen Demand) and COD (Chemical Oxygen Demand) were charged in a system. The various surfactants for testing were built into the final formulation. These samples were added to the system, and the reductions to BOD's and COD's were observed. These results helped to determine the biodegradability of the individual surfactant and the biodegradability of the raw waste. It also was a reflection of how the final microbial product would perform in reducing overall BOD's and COD's in a waste system.

Example 2

10% bacteria mixture of *Bacillus licheniformis, Bacillus subtilis, Bacillus amyloliquiefaciens, Bacillus polymyxa, Pseudomonas aeruginosa, Pseudomononas statzeri, Pseudomonas fluoresceni, Escherichia hermanii, Bacillus cereus, Bacillus thuringiensis,* and *Bacillus meg'afarium*.

30% 2:1 alkanolamide coco surfactant.

55% sodium thiosulfate.

5% nutrients: vitamin mixture and citric acid.

The results were that the emulsifiability-micelle formation excellent, it passed the emulsion-micelle stability test by lasting for more than about sixty days, the wetting Draves time was 12 seconds, and dissolvability was 25 minutes.

The present invention has been illustrated in great detail by the above specific examples. It is to be understood that these examples are illustrative embodiments and that this invention is not to be limited by any of the examples or details in the description. Those skilled in the art will recognize that the present invention is capable of many modifications and variations without departing from the scope of the invention. Accordingly, the detailed description and examples are meant to be illustrative and are not meant to limit in any manner the scope of the invention as set forth in the following claims. Rather, the claims appended hereto are to be construed broadly within the scope and spirit of the invention.

What is claimed is:

1. A bioremediation device for biological degradation of predetermined waste material in a collection system, said bioremediation device comprising:

a bioactive element that is soluble over time in said waste material, said bioactive element comprising at least one active ingredient present in a variable concentration, said at least one active ingredient comprising a nonionic or anionic surfactant capable of forming micelles with said waste material and microorganisms released from said dissolved element, wherein said bioremediation effect of said element is released into said waste as the said element is dissolved in said collection system and remediates said waste.

2. The bioremediation device of claim 1, wherein said nonionic surfactant comprises at least one polar ether linkage derived from polymerization of ethylene oxide or propylene oxide with a hydrophobic portion of said surfactant.

3. The bioremediation device of claim 2, wherein said nonionic surfactant is selected from the group consisting of alkanolamides, ethoxylated alkanolamides, ethylene bisamides, mono-ethanolamides, mono-isopropanolamides, modified alkanolamides, ethoxylated alkanolamides, PEG esters, ethoxylated acids and oils, sorbitol esters, ethoxylated sorbitol esters, emulsifying waxes and esters, octyphenol aromatic ethoxylates, nonylphenol aromatic ethoxylates, dionylphenol aromatic ethoxylates, dodecylphenol aromatic ethoxylates, tristyphenol ethoxylates, isotridecyl alcohol ethoxylates, isodecyl alcohol ethoxylates, linear alcohol ethoxylates, oleyl alcohol ethoxylates, ethoxylated mercaptans, capped ethoxylates, nonylphenol ethoxylates, coconut monoethanolamines, EO/PO block copolymer nonionics, and mixtures thereof.

4. The bioremediation device of claim 1, wherein said bioactive element comprises about 10% to about 50% by weight of said nonionic surfactant.

5. The bioremediation device of claim 1, wherein said bioactive element comprises about 30% to about 40% by weight of said nonionic surfactant.

6. The bioremediation device of claim 1, wherein said bioactive element comprises about 33% to about 38% by weight of said nonionic surfactant.

7. The bioremediation device of claim 1, wherein said bioactive element comprises at least one anionic surfactant carrying a negative charge on a hydrophilic portion thereof, said anioinic surfactant comprising a carboxylate, phosphate, sulfate or sulfonate radical.

8. The bioremediation device of claim 7, wherein said anionic surfactant is selected from the group consisting of alkyl sulfates, ether sulfates, dodecylbenzene sulfonates, alpha olefin sulfonates, diphenyloxide disulfonate, alkyl naphthalene sulfonates, sulfosuccinate, sulfosuccinamates, naphthalene-formaldehyde condenses, sulfonesters, sulfoamides, fatty acid taurates, fatty acid isethionates, phosphate esters, ether carboxylates, and mixtures thereof.

9. The bioremediation device of claim 1, wherein said bioactive element comprises about 10% to about 50% by weight of said anionic surfactant.

10. The bioremediation device of claim 1, wherein said bioactive element comprises about 30% to about 40% by weight of said anionic surfactant.

11. The bioremediation device of claim 1, wherein said bioactive element comprises about 33% to about 38% by weight of said anionic surfactant.

12. The bioremediation device of claim 1, wherein said bioactive element further comprises at least one microorganism or enzyme capable of organic reduction and organic maintenance.

13. The bioremediation device of claim 12, wherein said microorganism is selected from the group consisting of Gram positive spore forming microorganisms, *Bacillus licheniformis, Bacillus subtilis, Bacillus amyloliquiefaciens, Bacillus polymyxa, Pseudomonas aeruginosa, Pseudomononas statzeri, Pseudomonas fluoresceni, Escherichia hermanii, Bacillus cereus, Bacillus thuringiensis, Bacillus meg'afarium*, and mixtures thereof.

14. The bioremediation device of claim 13, wherein said bioactive element comprises about 10% to about 50% by weight of at least one of said microorganisms of no less than about 50 billion colony forming units per gram.

15. The bioremediation device of claim 13, wherein said bioactive element comprises about 30% to about 40% by weight of at least one of said microorganisms of no less than about 50 billion colony forming units per gram.

16. The bioremediation device of claim 13, wherein said bioactive element comprises about 32% to about 38% by weight of at least one of said microorganisms of no less than about 50 billion colony forming units per gram.

17. A bioremediation device for biological degradation of predetermined waste material in a collection system, said bioremediation devise comprising:
   a) a bioactive element that is soluble over time in said waste material, said bioactive element comprising at least one active ingredient present in a variable concentration, said at least one active ingredient comprising at least one microorganism or enzyme capable of organic reduction and organic maintenance and at least one nonionic surfactant capable of forming micelles with said waste material and said microorganisms released from said dissolved element;
   b) said nonionic surfactant comprising at least one polar ether linkage derived from polymerization of ethylene oxide or propylene oxide with a hydrophobic portion of said surfactant, said nonionic surfactant selected from the group consisting of alkanolamides, ethoxylated alkanolamides, ethylene bisamides, mono-ethanolamides, mono-isopropanolamides, modified alkanolamides, ethoxylated alkanolamides, PEG esters, ethoxylated acids and oils, sorbitol esters, ethoxylated sorbitol esters, emulsifying waxes and esters, octyphenol aromatic ethoxylates, nonylphenol aromatic ethoxylates, dionylphenol aromatic ethoxylates, dodecylphenol aromatic ethoxylates, tristyphenol ethoxylates, isotridecyl alcohol ethoxylates, isodecyl alcohol ethoxylates, linear alcohol ethoxylates, oleyl alcohol ethoxylates, ethoxylated mercaptans, capped ethoxylates, nonylphenol ethoxylates, coconut monoethanolamines, EO/PO block copolymer nonionics, and mixtures thereof; and
   c) said microorganism selected from the group consisting of Gram positive spore forming microorganisms, *Bacillus licheniformis, Bacillus subtilis, Bacillus amyloliquiefaciens, Bacillus polymyxa, Pseudomonas aeruginosa, Pseudomononas statzeri, Pseudomonas fluoresceni, Escherichia hermanii, Bacillus cereus, Bacillus thuringiensis, Bacillus meg'afarium*, and mixtures thereof, wherein said bioremediation effect of said element is released into said waste as the said element is dissolved in said collection system and remediates said waste.

18. The bioremediation device of claim 17, wherein said bioactive element further comprises at least one nutrient capable of promoting bacterial growth.

19. The bioremediation device of claim 18, wherein said nutrient is selected from the group consisting of vitamins A, B, E, K, and mixtures thereof.

20. The bioremediation device of claim 19, wherein said bioactive element comprises about 1% to about 3% by weight of said nutrient.

21. The bioremediation device of claim 17, wherein said bioactive element further comprises sodium thiosulfate, wherein said sodium thiosulfate is capable of neutralizing at least a portion of chlorine ions present in said waste system.

22. The bioremediation device of claim 21, wherein said bioactive element comprises about 1% to about 20% by weight of said sodium thiosulfate.

23. The bioremediation device of claim 21, wherein said bioactive element comprises about 3% to about 4% by weight of said sodium thiosulfate.

24. The bioremediation device of claim 17, wherein said bioactive element further comprises citric acid.

25. The bioremediation device of claim 24, wherein said bioactive element comprises about 1% to 20% by weight of said citric acid.

26. The bioremediation device of claim 17, wherein said bioactive element further comprises at least one surfactant selected from the group consisting of sodium sulfate, sodium sulfite, sodium nitrate, sodium nitrite, and mixtures thereof.

27. The bioremediation device of claim 17, wherein said bioactive element further comprises a cationic portion selected from the group consisting of calcium, potassium, and magnesium.

28. The bioremediation device of claim 17, wherein said bioactive element further comprises at least one anionic surfactant carrying a negative charge on a hydrophilic portion thereof, said anioinic surfactant comprising a carboxylate, phosphate, sulfate or sulfonate radical selected from the group consisting of alkyl sulfates, ether sulfates, dodecylbenzene sulfonates, alpha olefin sulfonates, diphenyloxide disulfonate, alkyl naphthalene sulfonates, sulfosuccinate, sulfosuccinamates, naphthalene-formaldehyde condenses, sulfonesters, sulfoamides, fatly acid taurates, fatty acid isethionates, phosphate esters, ether carboxylates, and mixtures thereof.

29. The bioremediation device of claim 17, wherein said bioactive element comprises about 33% to 38% by weight of said anionic surfactant, about 32% to about 38% by weight of a blend of said microorganisms of no less than about 50 billion colony forming units per gram, about 1% to about 3% by weight of said nutrient at least one nutrient capable of promoting bacterial growth wherein said nutrient is selected from the group consisting of vitamins A, B, E, K, and mixtures thereof, about 3% to about 4% by weight of sodium thiosulfate, and about 1% to about 20% by weight of citric acid.

\* \* \* \* \*